Jan. 29, 1924.                                                       1,481,885
M. A. BEACH
LIQUID DISPENSING APPARATUS
Filed July 7, 1920           5 Sheets-Sheet 1

Witness
Irving S. McCathan

Merrill A. Beach  INVENTOR.
BY
Richard B. Owen
ATTORNEY.

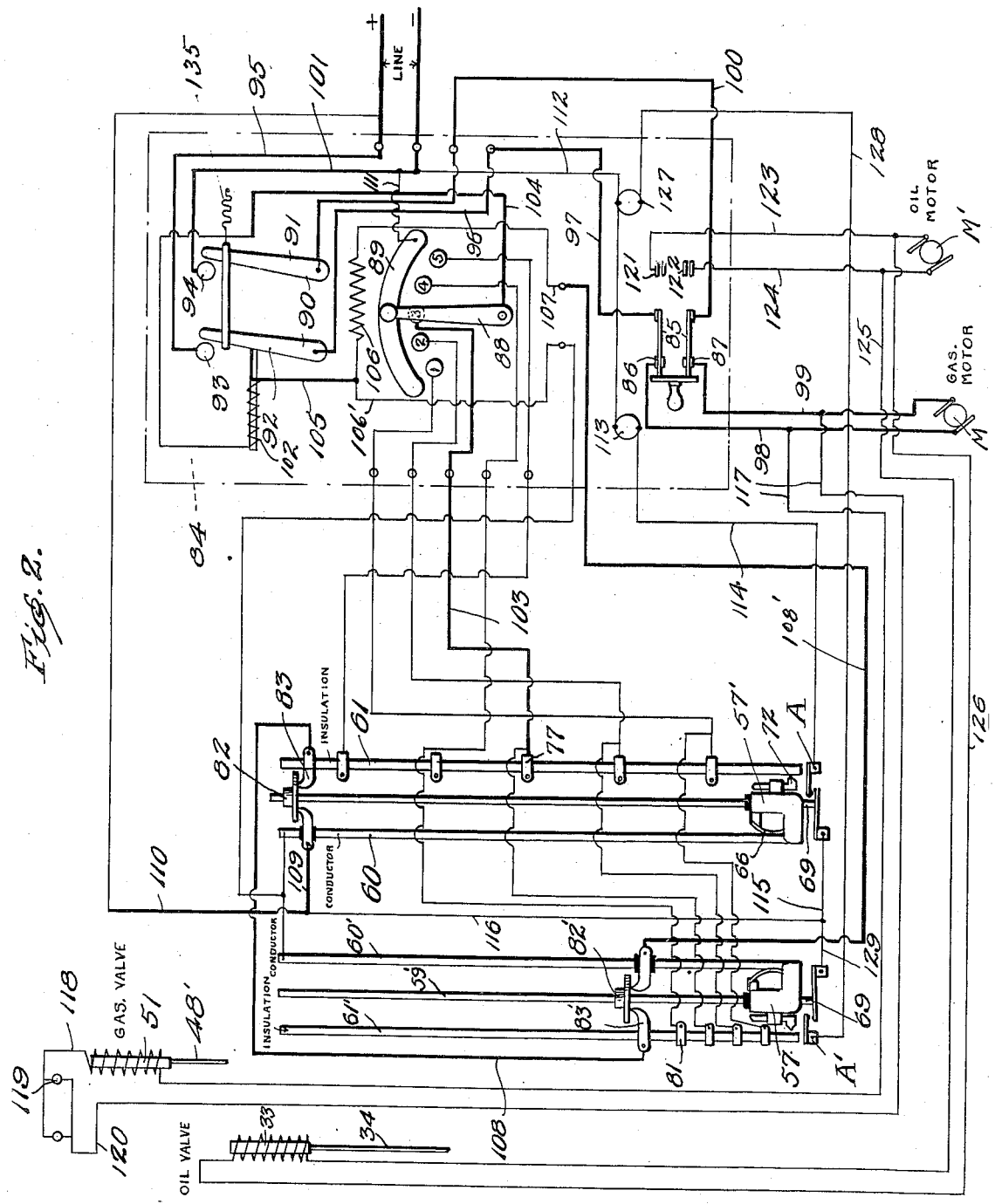

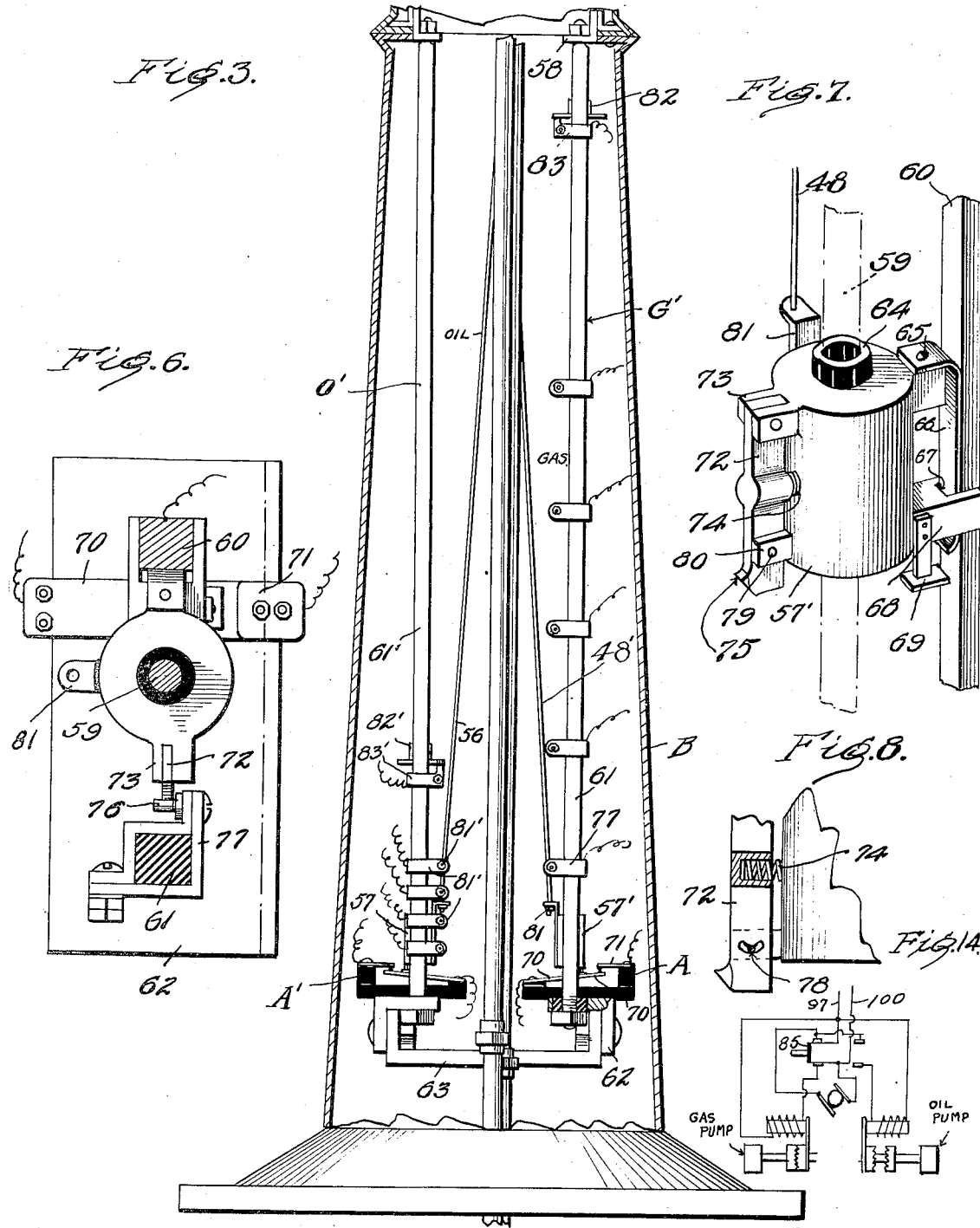

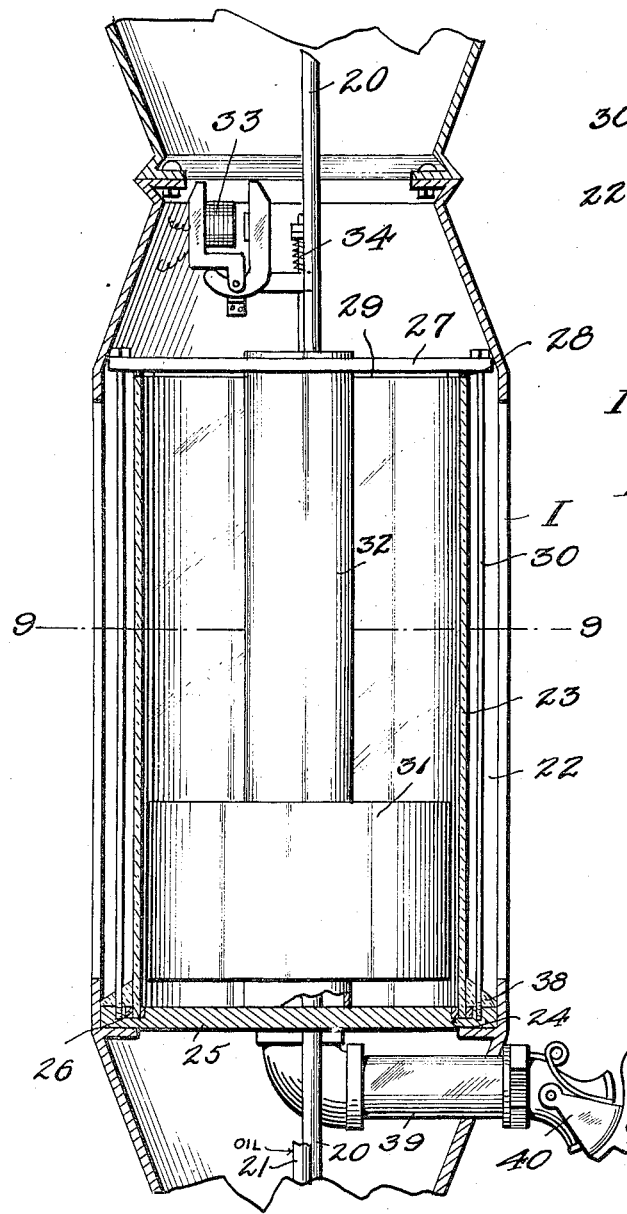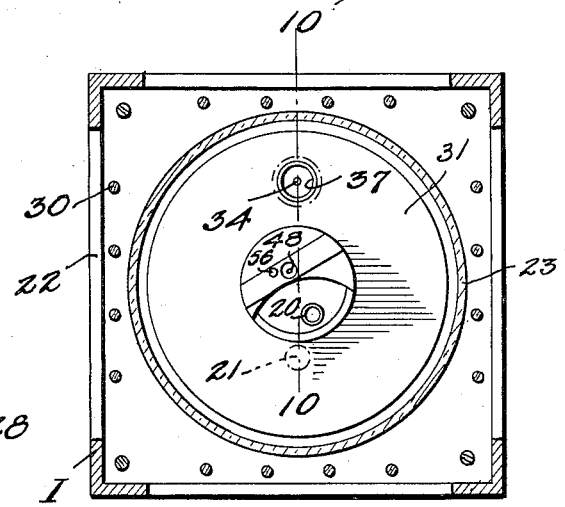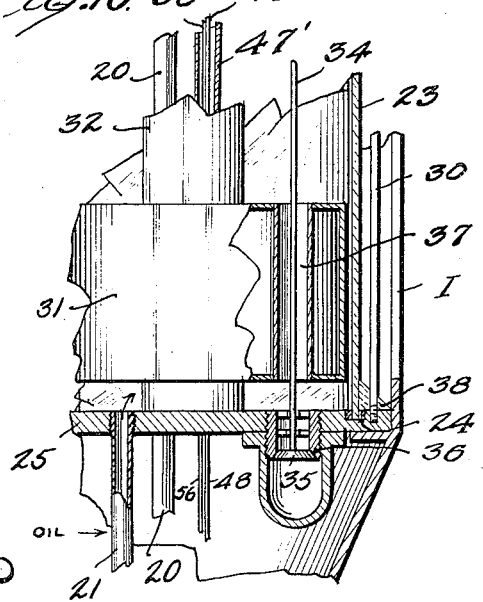

Jan. 29, 1924.                               1,481,885
M. A. BEACH
LIQUID DISPENSING APPARATUS
Filed July 7, 1920          5 Sheets-Sheet 5
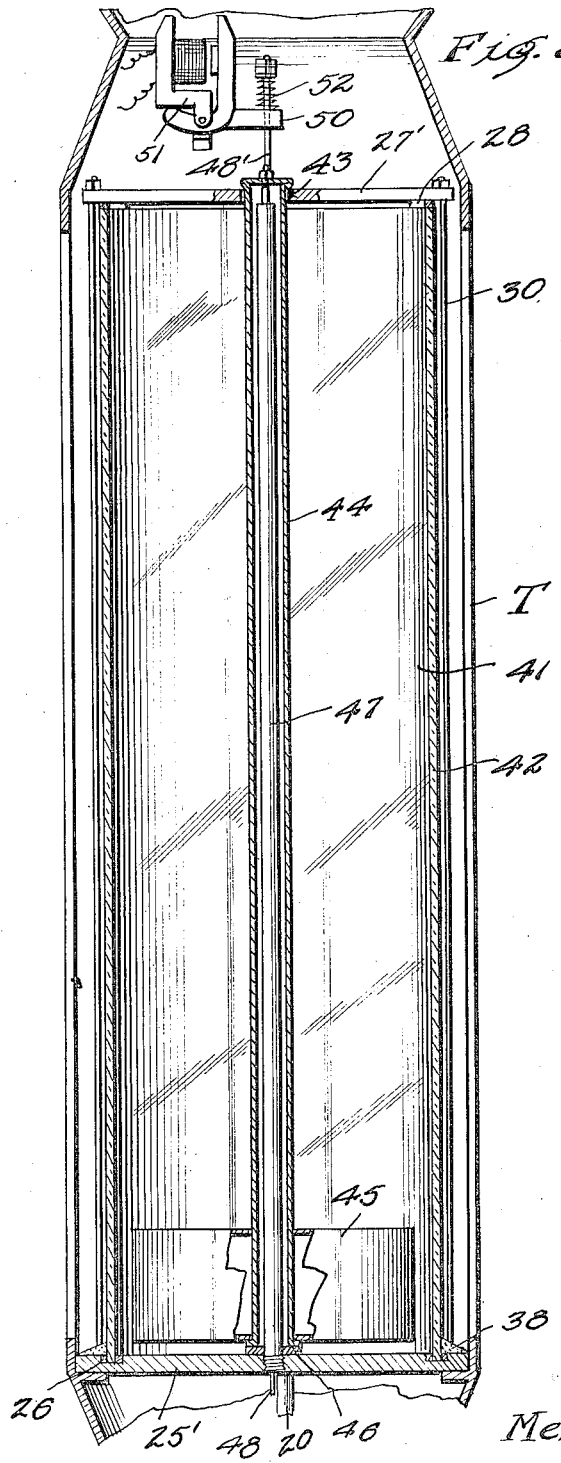
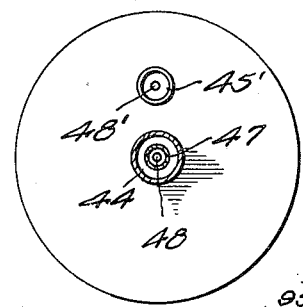
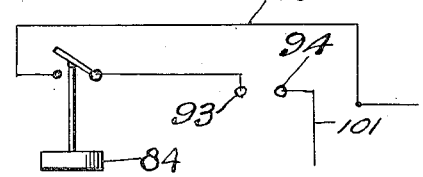
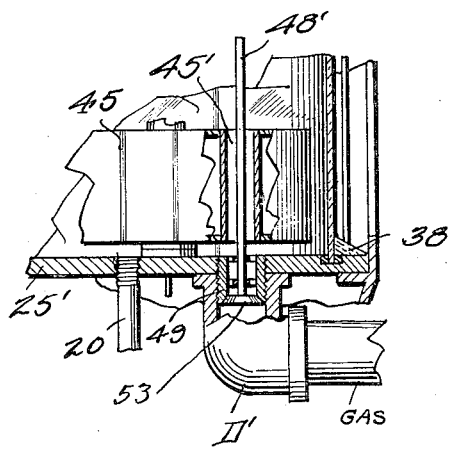
Merrill A. Beach INVENTOR.
BY Richard B. Owen ATTORNEY.
Witness Irving L. McCathran Patented Jan. 29, 1924.

1,481,885

UNITED STATES PATENT OFFICE.

MERRILL A. BEACH, OF PENN YAN, NEW YORK.

LIQUID-DISPENSING APPARATUS.

Application filed July 7, 1920. Serial No. 394,408.

*To all whom it may concern:*

Be it known that I, MERRILL A. BEACH, a citizen of the United States, residing at Penn Yan, in the county of Yates and State of New York, have invented certain new and useful Improvements in Liquid-Dispensing Apparatus, of which the following is a specification.

This invention relates to liquid dispensing apparatus and has for its object the production of a simple and efficient apparatus for handling gasoline, oil, and other liquid or fuel necessary for the operation of motor vehicles.

Another object of the present invention is to provide a liquid dispensing apparatus whereby the filling mechanism may be started at a distant point and whereby the filling mechanism will be automatically cut off when the liquid within the dispensing apparatus reaches a predetermined level.

Other objects and advantages of the present invention will appear throughout the following specification and claims.

In the drawings:

Figure 2 is a diagram of the electrical circuits involved for operating the mechanism comprising the present invention.

Figure 3 is a vertical section through the lower or base part of the standard of the liquid dispensing apparatus, the electrical contact means being shown therein.

Figure 4 is a vertical section through the oil measuring container which is adapted to be located directly above the base shown in Figure 3.

Figure 5 is a vertical sectional view through the gasoline measuring container, this container being adapted to be placed just above the oil measuring container.

Fig. 6 is a horizontal section taken through the lower part of the device and showing the contact arrangements.

Figure 7 is a detail perspective view of the float guide.

Figure 8 is a side elevation of a portion of the float guide, the contact arm being partly shown in section to illustrate spring carried thereby.

Figure 9 is a section taken on line 9—9 of Figure 4, the float being shown in top plan.

Figure 10 is a section taken on line 10—10 of Figure 9.

Figure 11 is a top plan view of a float carried within the gasoline measuring container, a portion thereof being shown in section and Figure 12 is a vertical section through the lower end of the gasoline measuring container taken at right angles to that shown in Figure 5.

Figure 13 is a diagram of an electrical means which may be employed for cutting off the current from the main line and preventing the liquid from overflowing.

Figure 14 is a diagram of an electrical means which may be employed for utilizing one motor for pumping gasoline and oil by using a solenoid control clutch.

Figure 1:
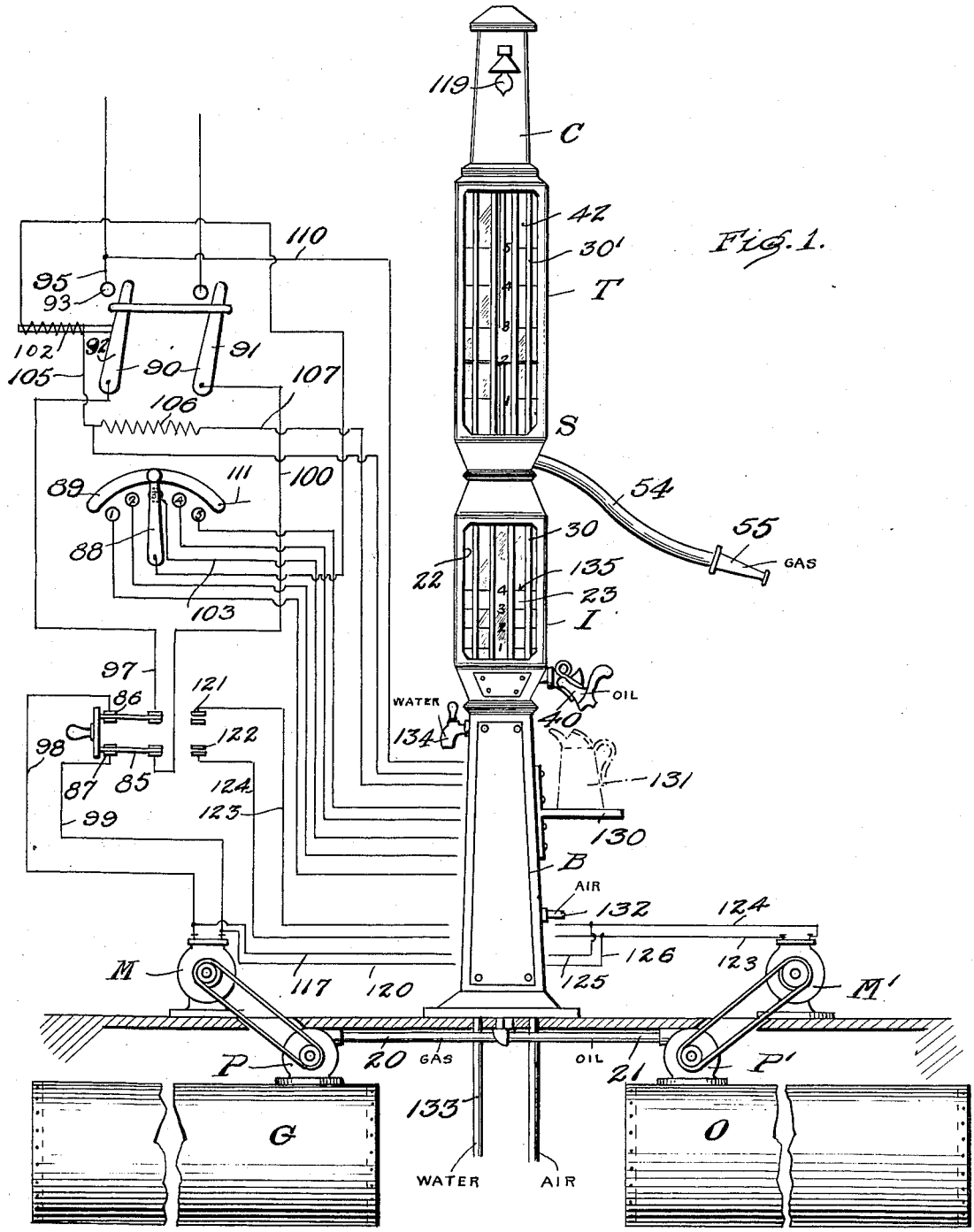
Figure 1 is a front elevation of the liquid dispensing apparatus, the supply tank being also shown in side elevation together with the pumps and motors associated therewith and the control circuit necessary for the operation of the motors.

By referring to the drawings it will be seen that a dispensing standard S is employed, which is preferably placed near the curb stone of a pavement and this dispensing standard S comprises a base section B, upon which is mounted an intermediate section I, this intermediate section I carrying a top section T, a cap section C being mounted upon the top section T as clearly shown in Figure 1. It should be understood, of course, that the dispensing standard S may be varied in design to suit the convenience of the manufacturer or user although, of course, it is advantageous to employ an attractive design whenever possible. A supply tank G is placed at any convenient point below the surface of the ground such as is illustrated in Figure 1, and a pump P is associated therewith for the purpose of pumping the gasoline or the fuel from the tank G to the pipe 20. This pump P is operated by means of an electric motor M and is controlled by a suitable apparatus hereinafter fully described. A tank O is also located at a convenient point, preferably being placed below the surface of the ground, and a pump P' is associated therewith for the purpose of pumping oil through pipe 21 from the tank O. A motor M' is associated with the pump P' for the purpose of actuating the same and is controlled by means of an electrical apparatus hereinafter described.

The intermediate section I is provided with open sides 22, and a glass cylinder 23 is carried within the intermediate section I as clearly shown in Figure 4. This glass cylinder 23 rests within a circular groove or channel 24 formed in the upper face of the supporting plate 25 and a suitable packing of fibre or other suitable material 26 is placed around the lower edge of the measuring cylinder 23 for the purpose of efficiently supporting the lower end of the container 23 in engagement with the plate 25. A cover plate 27 is mounted upon the upper end of the measuring container 23 and suitable yieldable spacing members 28 are interposed between the cover plate 27 and the upper end of the measuring container 23, for the purpose of producing an air space 29 between the upper edge of the measuring container 23 and the cover plate 27. The cover plate 27 is firmly held in clamped engagement with the measuring container 23 by means of suitable vertically extending brace rods 30 which rods 30 constitute a protector for shielding the measuring container 23 against injury as shown in Figure 9, these rods 30 constituting a grating for the open sides 22.

A float 31 is mounted within the measuring container 23, and this float 31 is provided with a centrally arranged vertically extending shield casing 32, which casing 32 projects through the cover plate 27 as shown clearly in Figure 4. The shield casing 32 also projects below the lower edge of the float 31 so as to support the same normally above the upper face of the supporting plate 25 and permit the float to be easily raised when oil is injected into the measuring container 23. The oil supply pipe 21 extends up through tthe base B and through the supporting plate 25 and communicates with the interior of the oil measuring container 23 as shown clearly in Figure 10. It will therefore be seen that as the motor M' is operated, the pump P' will also be operated and oil will be forced from the tank O up through the pipe 21 and into the oil container or measuring cylinder 23. The float 31 will then be caused to rise to a predetermined height whereupon suitable electrical mechanism will be operated as will be hereinafter described, causing the pump P' to be rendered inactive through the breaking of an electrical circuit. At the same time the solenoid 33 which is mounted just above the cover plate 27 will be de-energized, thereby permitting the valve rod 34, to drop and to cause the valve 35 to move to an open position by dropping away from the valve seat 36. A coil spring 37 is mounted upon the upper end of the rod 34 for the purpose of permitting the valve 35 to be yieldably held in engagement with the seat 36 while the measuring container 23 is being filled with oil. The rod 34 as shown in Figure 10 is extended through a channel 37 formed in the float 31. As shown in Figures 4 and 10 of the drawings, a suitably sealing filler of plastic material indicated by numeral 38 may be employed around the lower edge of the measuring container 23.

A drain pipe 39 is associated with the valve 35, and this drain pipe 39 is provided with a discharge nozzle 40 of any suitable or desired construction, preferably of a type which will permit the oil to be readily and rapidly discharged from the oil container. It is not desired, however, to limit the construction of this nozzle to any particular form for the reason that any form may be used without departing from the spirit of the invention.

The top section T supports the gasoline measuring receptacle 41 which comprises a glass measuring container 42 mounted in a similar manner to that described with respect to the oil container or measuring receptacle 23. In view of this similarity it is thought unnecessary to go into the description of the mounting and construction thereof. The reference numerals referring to the detail element of the container will be employed also upon Figure 5 wherein similar parts occur. The cover plates 27' which form a part of the gasoline container is provided with a centrally located aperture 43 through which aperture extends the upper end of the vertical shield tube or casing 44. This tube 44 is carried by the gasoline float 45 and the lower edge of the float 45 is supported above the bottom of the supporting plate 25' by means of the washer 46. An encasement tube 47 is carried by the supporting plate 25' and extends substantially the entire length of the tube 44. The connecting wire 48 extends through this encasement tube 47 and at its upper end is secured in engagement with the upper end of the tube 44 as shown in Figure 5. The float 45 is provided with a vertically extending channel 45' through which extends the valve operating rod 48', this rod 48' passing through the operating arm 50 of the solenoid 51. This solenoid 51 is supported in the upper end of the top section T and is so located to one side of the tube 44 as to permit the tube 44 to have vertical movement without interference with the solenoid 51. A coil spring 52 is mounted upon the rod 48' so as to permit the valve 53 carried by the lower end of the rod 48' to be yieldably held upon the valve seat 49. As gasoline is forced through the pipe 20 into the compartment 41 the float 45 will rise to the desired or predetermined point, whereupon the motor and pump which forces the gasoline through the pipe 20 will be rendered inactive and the solenoid 51 will be de-energized thereby permitting the valve 53 to drop to an open position and permit the gasoline within the compartment 41 to fill the discharge tube 54. A nozzle 55 is carried by the tube 54 and may be provided with any suitable valve mechanism for the purpose of controlling the discharge of the gasoline from the tube 54.

The operating wire 48 which is connected to the top of the tube 44 also passes through an encasement tube 47' which encasement tube is secured to the supporting plate 25 and extends substantially the entire height of the shield casing 32, in this way preventing the oil within the measuring container 23 from leaking through the bottom of the plate 25.

A control wire 56 is connected to the top of the shield casing 32 and passes longitudinally of the shield and through the encasement tube 47'. Both of the wires 48 and 56 extend down into the base section B and are connected to the respective float guides 57 and 57'.

Attention is now called particularly to Figure 3 of the drawings.

A plurality of hanger angle iron brackets 58 are suspended from the upper end of the base section B as shown in Figure 3 and a track rod 59' is suspended from each bracket 58. Upon either side of each track rod 59' is arranged a vertically extending guiding rod 60 of conducting material and a contact supporting rod 61 of insulating material. The rods 59, 60 and 61 are arranged in vertical alignment as clearly shown in Figure 6 of the drawings. The ends of the rod 60, 61 and 59 are anchored in engagement with the angle iron supporting plates 62, one plate 62 being employed for supporting each set of rods. The oppositely opposed angle iron plates 62 are connected by means of a transversely extending substantially U shaped base 63 shown clearly in Figure 3. One set of rods will be designated as O' for controlling the supply of oil and the other set of rods will be referred to as G' for controlling the supply of gasoline.

Float guides 57 and 57' are mounted upon the respective vertically extending rods 59 of each set of guide rods and each float guide comprises a substantially cylindrical body having an insulated sleeve 64 whereby the float guides 57 and 57' will be insulated from the supporting rods 59. The float guides 57' shown in detail in Figure 7 is of the same construction as that used upon the rods O' controlling the supply of oil and comprises a rearwardly extending lug 65, which lug 65 supports a contact spring 66, the contact spring 66 being adapted to travel upon the inner face of the conducting rod 60 as clearly shown in Figure 7. The lower end of the spring 66 fits between the notched end 67 of the lug 68 carried by the lower end of the float guide 57', the notched end of the lug 68 straddling the contact bar or track rail 60. A trip shoe 69 of insulated material is supported upon the lug 68 and is adapted to make the circuit between the contact arm 70 and 71 or the circuit breaker A. A contact arm 72 is pivotally mounted between the ears 73 carried by the float guide 57' and a coil spring 74 engages the contact arm 72 and normally urges the same outwardly. This arm 72 is provided with a projecting point 75 at the lower end thereof and this point is preferably silver-plated for the purpose of producing an efficient contact with the silver-plated contact lugs 76 carried by the conducting clamps 77 mounted upon the insulated track rods 61. A slot 78 is formed in the lower end of the contact arm 72 within which slot 78 works the pin 79 carried by the ears 80 for limiting the outward swinging movement of the contact arm 72. A wire connecting strap 81 is connected to the float guides 57' upon one side thereof and is insulated therefrom, this strap 81 being connected to the wire 48, which wire 48 is connected at its upper end through the top of the shield tube 44 shown clearly in Figure 5. The float guide 57 which is carried upon the opposite side with respect to the float guides 57', is connected in a similar manner with the wire 56, and this wire 56 extends vertically of the dispensing standard and is secured to the upper end of the shield casing 32 as shown in Figure 9. The contact clamps 77 are arranged upon the rod 61 at suitable points so that the pump P will be permitted to operate a sufficient length of time to pump anywhere from one to five gallons of gasoline into the container 42. Suitable contact clamps 81' are mounted upon the insulated rod 61' at suitable points so as to connect the pump P' to pump oil into the cylinder 23 from anywhere to one to four quarts. It, of course, should be understood that these contact points may be multiplied or arranged upon the rod 61 and 61' to fit the convenience of the operator.

Circuit closing shoes 82 and 82' are slidably mounted upon the respective rods 59 and 59' and these shoes 82 rest upon the respective contact clamps 83 and 83' for the purpose of producing a limit switch for both the gasoline and oil control mechanisms. It is understood that one of contacts 83 and 83' is insulated from rod 60 and 60'. This construction can be easily understood by considering Figure 2 of the drawings. A circuit breaker A' is carried by the lower end of the oil control mechanism O' as clearly shown in Figure 3 and is similarly constructed to the circuit breaker shown at A the same to be opened and closed through the medium of the insulated shoes 69 mounted upon the float guide which cooperates therewith.

In conjunction with the mechanical apparatus above described certain electrical mechanism is necessary for accomplishing the desired result and this mechanism is arranged and constructed as follows:

A switch board 84 is located preferably within the service station or at a point convenient to the clerk who may be handling accessories and the like within the service station. It has been found preferable to so locate the switch board in actual practise thereby eliminating the necessity of an extra attendant for the purpose of operating the mechanism for dispensing the fuel. A double throw switch 85 is mounted upon the switch board 84 and is adapted to close the circuit with the poles 86 and 87. A control switch 88 is also mounted upon the switch board 84 and is adapted to close the circuit with one of the selected contacts such as 1, 2, 3, 4, or 5. A contact plate 89 is also employed in conjunction with the variable control switch whereby a circuit will be closed through the plate 89 when the switch is brought into contact with one of the electric contacts 1, 2, 3, 4, or 5, and handle of arm 88 is pressed in instantaneous contact with plate 89. A remote control switch of the ordinary construction 90 is also mounted upon the switch board and comprises arms 91 and 92. This remote control switch 90 is adapted to have the arms 91 and 92 contact with the respective poles 93 and 94.

The line wires marked in the usual manner with the positive and negative signs, lead into contact points 93 and 94. At 90 is a switch having blades or arms 91 and 92, the switch being operated in one direction by a solenoid 102 and urged in the other direction by a spring 135. The various parts of the device are connected by wires in the manner shown in Figure 2 and this wiring connection will be understood from the description of the operation.

It is to be noted that the winding of the solenoid is so proportioned to the tension on the spring 135 that a short circuiting of the current through the wire 106 prime will sufficiently de-energize the solenoid to permit the spring to open the switch 90.

Should you desire to pump 3 gallons of gasoline into the gasoline container or measuring container 42 the variable control switch 88 may be swung to the position shown in Figure 2 or to contact with the contact point 3 and the switch 85 may be thrown into engagement with the poles 86 and 87. The switch arm of the variable control switch 88 is then pressed inwardly, thereby closing a circuit through the contact 3, plate 89 and arm 88 which will cause the current to travel as follows:

Current will now flow from the positive line wire through wire 110, wire 109, left contact 83, plate 82, right contact 83, wire 108, left contact 83', plate 82', right contact 83', wire 108', wire 107, resistance 106 (this being used to hold down the excessive current which would pass through the magnet while the pump is not in operation) wire 105, solenoid 102, wire 104, arm 88, segment 89, wire 111 to the negative line wire.

Thus the solenoid 102 is energized and the switch 90 is closed.

With the switch 90 closed the closing of the switch 85 on the gasoline pump side will cause flow of the current as follows: from the positive line wire, through wire 95, contact 93, blade 92, wire 96, wire 97, switch 85, contact 86, wire 98, motor M, wire 99, contact 87, switch 85, wire 100, blade 91, and contact 94 to the negative line wire. Meanwhile the solenoid coil will remain energized as above described.

When, however, the float guide rises and establishes contact with the contact block 77, (it being remembered that the arm 88 is on point 3 which is the three gallon point) the current will flow in the same manner as before until the resistance 106 is passed. From this point the current will tend to flow in part over the remainder of the circuit first traced through the solenoid coil 102. This will be prevented, however, by the following action.

From the resistance 106 the current will flow through the wire 106', conductor 60, float guide contact 66, contact 72, contact 77, wire 103, point 3, arm 88, segment 89, and in part over wire 111 to the negative line wire. The other part will tend to flow from the arm 88 through wire 104, solenoid 102, wire 105, resistance 106 in a direction reverse to the normal current, wire 107, contact 83', plate 82', contact 83', wire 108, contact 83, plate 82, contact 83, wire 109, wire 110 to the positive side of the line. This will thus counteract the original current through the solenoid and the switch 92 will open.

Any current flowing from the resistance 106 through the wire 105, solenoid 102, wire 104 and arm 88 to the segment 89 and thus the negative line wire will be too small to hold the switch 92 closed against the action of the spring 135 and consequently the switch will open.

As soon as the switch 90 opens the operator removes his hand from the switch 88 thereby opening the circuit first described and leaving the solenoid de-energized. As soon as the float guide starts to rise the circuit closer A will close. Current will then flow from the line wire through wire 110, wire 116, wire 115, circuit closer A, wire 114, lamp 113, and back to the negative line wire thus lighting the lamp. When the solenoid 102, is short circuited the float drops back to its original position and breaks this circuit indicating the end of the operation. In case the automatic motor stop fails to work and the float guide rises beyond the fifth member 77 the circuit controlling the solenoid as first described will be broken by the lifting of the plate 82 off of the contacts 83. It will also be obvious that the wires 117, leading from the wires 98 and 99 serve to energize the gasoline valve solenoid during the running of the motor, this being a shunt circuit.

On the other hand if three quarts of oil is desired the switch 85, in place of being thrown in contact with the contact posts 86 and 87 will be thrown into contact with the contact posts 121 and 122 and the same operation gone through which would operate the motor M' in place of the motor M.

It will be obvious that with the switch 85 thrown to the right as just described the operation of the oil feeding and controlling system will be effectively similar to that of the gasoline controlling system and it is not deemed necessary to specifically trace these circuits as the same can be readily followed in like manner to the foregoing.

In the foregoing description it will be seen that a very simple and efficient apparatus has been produced which will not only efficiently pump the desired amount of fuel into the measuring container, but is so constructed as to permit the employment of a minimum amount of help or a minimum number of attendants for accomplishing the desired results, to wit: the dispensing of fuel to drivers of motor vehicles and the like. When the gasoline motor M is in operation, the light 113 burns on the switchboard and continues to burn until container 42 is empty and the light 119 also burns on the dispensing standard. When oil is being pumped, however, the light 127 on the switchboard will burn, and continue to burn until container is empty. As indicated in Figure 1 a shelf 130 is mounted upon the base B for the purpose of supporting a suitable cup 131 and receiving the oil from the discharge nozzle 40. An air pipe 132 may also be employed in connection with the device illustrated for the purpose of permitting air to be dispensed from the air pipe as indicated. A water supply pipe 133 may be also connected to a faucet 134 for the purpose of permitting the customers to replenish their water-supplies for the purpose of refilling the radiator. It of course, should be understood that certain suitable cover plates may be employed in connection with the apparatus to permit the operator to have access to the interior of the mechanism. It is further obvious that suitable graduation 135 may be arranged to fit the convenience of the operator and the amount of fuel to be used in connection therewith, upon the glass containers 23 and 42, thereby permitting the customer to readily see the amount of fuel which he has purchased, also containers may be built of any size or capacity, liquid pumped in at any speed as is necessary to meet requirements of trade.

One motor may operate both the gas and oil pumps by using a solenoid control clutch.

An automatic change device may be installed for carrying change to and from station to outside to switchboard inside.

A safety float may also be placed in top of containers that would open main electric circuit, preventing the liquids from overflowing in case any part of the apparatus ever failed to function properly.

All electric contacts may be constructed to meet the approval of the underwriters.

What I claim is:—

1. A liquid dispensing apparatus comprising a measuring receptacle, a reservoir, a pump for filling said measuring receptacle from said reservoir, means mounted within said measuring receptacle and co-operating with said pump for automatically rendering said pump inactive when a predetermined amount of liquid has entered said measuring receptacle, a variable control switch remotely located with respect to said measuring receptacle and co-acting with said means for regulating the amount of liquid entering said measuring receptacle, and means for automatically draining said measuring receptacle.

2. A liquid dispensing apparatus comprising a measuring receptacle, a reservoir, a pump, an electrical mechanism for rendering said pump active, a variable switch co-operating with said electrical mechanism and controlling the delivery of liquid by the pump, and means associated with said measuring receptacle and also associated with said electrical mechanism and variable switch for rendering said pump inactive when a predetermined amount of liquid enters said measuring receptacle.

3. A liquid dispensing apparatus comprising a measuring receptacle, a reservoir, a pump, an electrical mechanism co-operating with said pump for rendering the same active, a selective switch co-operating with said electrical mechanism, and controlling the delivery of liquid by the pump, a float mounted in said measuring receptacle, contact means electrically connected with said selective switch and said electrical mechanism, and means co-operating with said float and adapted to engage said contact means for short-circuiting said pump and electrical mechanism cooperating therewith for rendering said pump inactive when a predetermined amount of liquid enters said measuring receptacle.

4. A liquid dispensing apparatus comprising a measuring receptacle, a reservoir, a pump co-operating with said reservoir for pumping liquid from the same into said measuring receptacle, electrical control means for actuating said pump, a selective switch co-operating with said electrical control means, and controlling the delivery of liquid by the pump, a float mounted in said measuring receptacle, electrical contact means electrically connected with said switch and pump, for rendering said pump inactive when a predetermined amount of liquid enters said measuring receptacle, a drain mechanism, co-operating with said measuring receptacle for permitting the emptying thereof, a valve mechanism for normally closing said drain and means electrically connected to said valve mechanism for holding the same in a closed position while said measuring receptacle is being filled, and permitting said valve to automatically open when said pump is rendered inactive when a predetermined amount of liquid has entered said measuring receptacle.

5. A liquid dispensing apparatus of the class described comprising a measuring receptacle, a pump co-operating with said measuring receptacle, a reservoir associated with said pump, and electrical means co-operating with said pump for rendering the same active, a selective switch electrically connected with said pump and controlling the delivery of liquid by the pump, a remote control switch electrically connected with said pump and said selective switch, a float carried within said measuring receptacle, contact means associated with said measuring receptacle and electrically connected with said selective switch and motor as well as said remote control switch whereby the motor will be rendered inactive when said float reaches a predetermined height within said measuring receptacle, and drain means carried by said measuring receptacle.

6. A liquid dispensing apparatus of the class described comprising a measuring receptacle, a reservoir, a pump, means electrically connected to said pump for actuating the same, a switch for controlling the operation of said pump, a selective switch in circuit with said pump, a remote control switch located in said circuit, a plurality of contacts associated with said electrical switch and said motor, a float mounted in said measuring receptacle, and means associated with said float and adapted to be brought into contact with said contact means whereby said remote control switch will be shunted and said motor will be rendered inactive, thereby discontinuing the filling of said measuring receptacle.

7. A liquid despensing apparatus of the class described comprising a measuring receptacle, a float mounted therein, a float guide connected to said float, track members for supporting said float guide, a plurality of contacts mounted upon said track and adapted to contact with said float guide, a selective switch electrically connected to said contact, a remote control switch electrically connected with said selective switch, a pump, a manually controlled switch for making and breaking the circuit through said pump and said float guide adapted to shunt said remote control switch as a circuit is closed between one of said contacts and said float guide.

8. A liquid dispensing apparatus comprising a measuring receptacle, a reservoir, a pump, a remote control switch electrically connected with said pump, a manually controlled switch located in said circuit, a selective switch co-operating with said remote control switch, a plurality of selective contacts located adjacent said measuring receptacle, a float guide, a float mounted in said receptacle connected to said float guide, means for electrically connecting said float guide through said remote control switch to said motor, whereby said remote control switch will be shunted as said float guides form a contact with one of the selective contacts associated with said measuring receptacle, and signaling means associated with said float guides for indicating the operation of said float guides.

9. A liquid dispensing apparatus comprising a measuring receptacle, a reservoir, a pump, a remote control switch electrically connected with said pump, a manually controlled switch, located in said circuit, a selective switch co-operating with said remote control switch, a plurality of selective contacts located adjacent said measuring receptacle, a float guide, a float mounted in said receptacle connected to said float guide, means for electrically connecting said float guide through said remote control switch as said float guides form a contact with one of the selective contacts associated with said measuring receptacle, a signal electrically associated with said float guides whereby said signalling means will be rendered active as said float guide rises, and whereby said signalling means will be rendered inactive as said float guide drops to an inactive position.

10. A liquid dispensing apparatus comprising a measuring receptacle, a reservoir, a pump, a remote control switch electrically connected with said pump, a manually controlled switch, located in said circuit, a selective switch co-operating with said remote control switch, a plurality of selective contacts located adjacent said measuring receptacle, a float guide, a float mounted in said receptacle connected to said float guide, means for electrically connecting said float guide through said remote control switch as said float guides form a contact with one of the selective contacts associated with said measuring receptacle, a signal electrically associated with said float guides whereby said signalling means will be rendered active as said float guide rises, and whereby said signalling means will be rendered inactive as said float guide drops to an inactive position, and a limit switch co-operating with said float guide and electrically connected in circuit with said motor whereby said motor will be rendered inactive should said float guide rise beyond a predetermined point.

11. A liquid dispensing apparatus comprising a measuring receptacle, a pump, a reservoir, means electrically connecting said pump for actuating the same, a manually controlled switch in circuit with said pump, a selective switch in circuit with said pump, a remote control switch in circuit with said selective switch, and pump, and a float mounted in said measuring receptacle, electrical contact means associated with said float and electrically connected with said selective switch, means co-operating with said float for contacting with said contact means, a drain for said measuring receptacle, electrical means in circuit with said pump for closing said drain while said receptacle is being filled, and automatically opening said drain as said pump is rendered inactive, and signalling means adapted to be rendered active as soon as said float begins to rise.

12. A liquid dispensing apparatus comprising a measuring receptacle, a motor comprising a pump, a reservoir, for filling said measuring receptacle, a drain co-operating with said measuring receptacle, an electrically controlled valve adapted to be normally closed while said measuring receptacle is being filled and adapted to automatically open when a predetermined amount of liquid enters said receptacle, a selective switch remotely located with respect to said measuring receptacle, a remote control switch co-operating with said selective switch located in circuit with said selective switch, a plurality of contacts co-operating with said selective switch, a float mounted in said measuring receptacle, and a circuit closing float guide adapted to contact with said contact by shunting said remote control switch and rendering said motor inactive when a predetermined amount of liquid enters said measuring receptacle.

13. A liquid dispensing apparatus of the class described comprising a plurality of measuring receptacles, a float mounted within each receptacle, a reservoir, connected to each receptacle, a pump for each receptacle, electrical means for operating said pumps, a manually controlled switch for permitting said pumps to be thrown into and out of operation, a selective switch in circuit with said pumps, electrical contacts co-operating with each float and electrically connected with said selective switch, a remote controlled switch in circuit with said selective switch, means for closing a circuit with said contact whereby said remote controlled switch will be shunted when the float in either receptacle reaches a predetermined height, whereby the active motor will be rendered inactive.

14. A liquid dispensing apparatus of the class described comprising a gasoline measuring receptacle and an oil measuring receptacle, a float mounted within each receptacle, a float guide connected to each float, guide tracks co-operating with each float guide, a plurality of contacts mounted in conjunction with each set of tracks, said float guides adapted to close a circuit with said respective contacts, a pump for each measuring receptacle, an electrical circuit for operating each pump, a manually controlled switch mounted in said circuit, a selective switch mounted in said circuit and electrically connected with the respective contacts by each float guide, a remote control switch electrically connected with said selective switch, a drain for each receptacle, an electrically controlled valve for closing the drain of each receptacle while the same are being filled, and said float guide adapted to shunt said remote control switch when the same reaches a predetermined height and closes a contact with a selective contact co-operating therewith for rendering said pump inactive and opening the closed valve of the filled measuring receptacle.

15. A liquid dispensing apparatus of the class described comprising a measuring receptacle, means for filling said measuring receptacle, a float mounted within said receptacle, contacts mounted adjacent said receptacle, a sliding float guide, said sliding float guide comprising a body having a pivotally mounted spring pressed arm secured to one side thereof, a contact point formed thereon adapted to contact with said first mentioned contact, a conductor rail, a spring secured to said float guide and engaging said conductor rail for constituting a contact connection therewith, whereby said contact arm will discontinue the operation of the filling means for said receptacle when the same contacts with one of said selected contacts, a signal light for indicating the operating of the device comprising a circuit, a circuit breaker adapted to be associated with said float guide, and an insulated trip adapted to engage said circuit breaker when said float guide is inactive for breaking said circuit and rendering said signal light inactive.

In testimony whereof I affix my signature in presence of two witnesses.

MERRILL A. BEACH.

Witnesses:
OLIVER SHEPPARD,
JOHN GAVIN.